US009144827B2

(12) United States Patent
Desprez

(10) Patent No.: US 9,144,827 B2
(45) Date of Patent: Sep. 29, 2015

(54) POSTAL SORTING METHOD WITH USER PROCESSING INFORMATION BEING RECOVERED BETWEEN SORTING PASSES

(75) Inventor: Olivier Desprez, Versailles (FR)

(73) Assignee: SOLYSTIC, Gentilly Cedex (FR)

( * ) Notice: Subject to any disclaimer, the term of this patent is extended or adjusted under 35 U.S.C. 154(b) by 847 days.

(21) Appl. No.: 13/259,443

(22) PCT Filed: Jun. 14, 2011

(86) PCT No.: PCT/FR2011/051340
§ 371 (c)(1), (2), (4) Date: Sep. 23, 2011

(87) PCT Pub. No.: WO2012/038626
PCT Pub. Date: Mar. 29, 2012

(65) Prior Publication Data

US 2012/0173015 A1 Jul. 5, 2012

(30) Foreign Application Priority Data

Sep. 23, 2010 (FR) ..................................... 10 57658

(51) Int. Cl.
*G06F 7/00* (2006.01)
*B07C 3/14* (2006.01)

(52) U.S. Cl.
CPC ....................................... *B07C 3/14* (2013.01)

(58) Field of Classification Search
USPC .................................. 700/223, 224; 209/584
See application file for complete search history.

(56) References Cited

U.S. PATENT DOCUMENTS 6,316,741 B1 * 11/2001 Fitzgibbons et al. ......... 209/584
6,888,084 B1 5/2005 Bayer
8,224,479 B2 * 7/2012 Caillon ........................ 700/223
2006/0036347 A1 * 2/2006 DeWitt et al. ................ 700/224
2010/0040256 A1 * 2/2010 Rundle ........................ 382/101

FOREIGN PATENT DOCUMENTS

DE 19947259 C1 9/2000
DE 20218212 U1 2/2004
WO 2008152277 A2 12/2008

OTHER PUBLICATIONS

English Translation of First Office Action issued in corresponding CN Application No. 2011800459159, 2 pages.
English Translation of Office Action issued on Nov. 25, 2014, in corresponding Japanese Application No. 2013-529694, 6 pages.

* cited by examiner

*Primary Examiner* — Kyle Logan
(74) *Attorney, Agent, or Firm* — Rothwell, Figg, Ernst & Manbeck, P.C.

(57) ABSTRACT

A postal sorting method in which mailpieces are subjected to at least two sorting passes in a machine so as to be sequenced in sorting outlets of the machine, and user processing information (PF) is available in the machine during a first sorting pass in relation to at least a certain mailpiece, is characterized in that it includes a step consisting, in a memory, in associating said user processing information with a graphical signature of the mailpiece that is representative of an image of the mailpiece, and in recovering (32, 33), during the second machine sorting pass of said certain mailpiece, said user processing information that is associated with it on the basis of matching of graphical signatures using a certain resemblance criterion.

11 Claims, 2 Drawing Sheets

POSTAL SORTING METHOD WITH USER PROCESSING INFORMATION BEING RECOVERED BETWEEN SORTING PASSES

CROSS REFERENCE TO RELATED APPLICATION(S)

This application is a 35 U.S.C. §371 National Phase Entry Application from PCT/FR2011/051340, filed Jun. 14, 2011, designating the United States and also claims the benefit of French Application No. 1057658, filed Sep. 23, 2010, the disclosures of which are incorporated herein by reference in their entirety.

TECHNICAL FIELD

The invention relates to a postal sorting method in which mailpieces are subjected to at least two sorting passes in a machine so as to be sequenced in sorting outlets of the machine, and user processing information is available in the machine during a first sorting pass in relation to at least a certain mailpiece.

PRIOR ART

The context of the invention is more particularly the context of sorting bulk mail, i.e. large numbers of mailpieces coming from the same sender. By way of example, in a "run" situation where a group of uniform mailpieces coming from the same sender are input into the postal sorting machine, the machine operator may need to pre-define a "frame" around the position of the recipient address block (which may be referred to as the "user frame"), in the images of said mailpieces through a graphical interface in such manner as to force the optical character recognition (OCR) address recognition processing to work on a predetermined zone of pixels in the images of the mailpieces. This assistance from the machine operator makes it possible, inter alia, to reduce the failure rate of recognition.

The machine operator may also need to input other user processing information that is useful for automatically processing mailpieces, e.g. spatial position in the image of the pixel zone corresponding to the address block of the sender. The machine operator may also input, as user processing information, the fact that the mailpieces have a particular tracking rule to avoid them being returned to sender, etc.

Information describing the physical structure of the mailpieces, namely whether they are mailpieces in envelopes or in plastics wrappers, or indeed open mailpieces, or mailpieces of the magazine type, etc. may also be input in the postal sorting machine by the machine operator in order to optimize operation of the data processing and of the mechanical handling.

Such user processing information may also be pre-recorded in a machine file and thus retrieved automatically instead of being input manually by the machine operator.

Other user processing information relating to physical characteristics of the mailpieces may also be produced by the peripherals of the machine during sorting of the mailpieces, such as weight, thickness, or other physical magnitudes. The frame encompassing the recipient address block zone may also be determined by the sorting machine processing itself after a running-in stage, i.e. once the information about the position of the address block has become reliable statistically, it being possible for the level of confidence in the result of the OCR address recognition to be a measure of such reliability.

All of the user processing information that is related to processing of mailpieces that are uniform in that they come, in particular, from the same sender and in that they are of very similar graphical appearance can thus serve for configuring or adjusting the machine, so as to contribute to optimizing operation thereof in the various sorting passes.

SUMMARY OF THE INVENTION

The invention stems from the observation that said user processing information is not used after the first sorting pass of the mailpieces because, after the first sorting pass, there is no grouping-together of uniform mailpieces into batches (as there is in the first pass).

An object of the invention is to enable the user processing information, input by a machine operator or already prerecorded in the machine, or indeed produced in the first sorting pass by the data processing of the machine, to be made available in the subsequent sorting passes so that said user processing information can be used in association with the relevant mailpieces.

The invention thus provides a postal sorting method in which mailpieces are subjected to at least two sorting passes in a machine so as to be sequenced in sorting outlets of the machine, and user processing information is available in the machine during a first sorting pass in relation to at least a certain mailpiece, said postal sorting method being characterized in that it includes a step consisting, in a memory, in associating said user processing information with a graphical signature of the mailpiece that is representative of an image of the mailpiece, and in recovering, during the second machine sorting pass of said certain mailpiece, said user processing information that is associated with it on the basis of matching of graphical signatures using a certain resemblance criterion.

The descriptors of these graphical signatures are preferably invariant to rotation of the digital images of the mailpieces so as to permit graphical signature indexing and searching that are robust during the successive sorting passes. The descriptors may be based on local and global characteristics of the pixels of the mailpiece images in grayscale or in binary format using multi-scale partitioning, e.g. luminance statistics. Such a descriptor is, for example, described in Patent Document EP 1 519 796. In that document it corresponds to the image component of a unique virtual mailpiece identifier. The graphical resemblance criterion for resemblance between two graphical signatures may, for example, be a normalized correlation coefficient.

According to the invention, while a set of mailpieces are being recirculated into the machine for a second sorting pass, graphical signatures associated with user processing information are filtered for the purpose of dynamically creating a dictionary of graphical signature classes, and matching is detected between a graphical class and a graphical signature of a mailpiece as computed during the second sorting pass for the purpose of recovering the user processing information associated with said mailpiece. This makes it possible to obtain better compactness for the information in the machine memory, more effective searches for graphical signature matching, and a reduction in data interchange. In particular, at the time of unloading of a sorting outlet receptacle at the end of the first sorting pass, or indeed at the instant at which a sorting outlet receptacle is recirculated at the beginning of the second sorting pass, the graphical signatures generated for mailpieces stored in the receptacle and related to user processing information are grouped together and classified as a function of the user processing information for the purpose of dynamically creating a dictionary of graphical signature classes having a context that is localized to the sorting outlet receptacle in question. The method of the invention also makes it possible to recover user processing information for mailpieces processed in the second sorting pass but that did not have user processing information in the first sorting pass. This applies, for example, for two batches of similar mailpieces unstacked in the first sorting pass in two different machines while only the mailpieces of a first one of the two batches have been associated with user processing information. In the second sorting pass, the method of the invention makes it possible to recover user processing information for mailpieces that are part of the second batch of mailpieces.

Each graphical class of the dictionary is thus representative of one or more similar graphical signatures. It is thus possible, for each receptacle recirculated into the inlet of a postal sorting machine in a subsequent sorting pass, to have a small context of graphical classes that can be extended or reduced in such manner as to adapt to only the mailpieces present at the inlet of said machine. In accordance with the invention, each graphical class has a descriptor that can be a mean value of descriptors of a plurality of similar graphical signatures. The threshold for similarity between a graphical signature and a graphical class for the matching may be set so as to enable, where applicable, user processing information to be recovered for mailpieces coming from different senders but presenting high graphical similarity.

The principle of creating a dynamic dictionary of graphical classes consists in presenting to a current dictionary of graphical classes each new mailpiece graphical signature related to user processing information to be recovered in a subsequent sorting pass. In the event of matching with a graphical class present in the dictionary, the descriptor of the graphical class in question is updated by consolidation with the descriptor of the new graphical signature (the update consists in computing a mean value for the descriptors). Otherwise, a new graphical class is created in the dictionary with, as descriptor, the descriptor of the new graphical signature.

This type of dynamic grouping together of the graphical signatures avoids management and interchange of large databases between the postal sorting machines or the postal sorting sites. These directories or dictionaries of graphical signature classes may be part of a database that is organized and segmented by sorting outlet receptacle. The dynamic grouping-together of the graphical signatures also makes it possible to have a limited search context for matching of graphical signatures.

The invention is applicable to a postal sorting architecture using unique virtual identifiers for mailpieces in compliance with Solystic's "V-Id®" technology described in above-mentioned Patent Document EP 1 519 796. In which case, the user processing information is conveyed through the successive sorting passes in relation to said mailpiece virtual identifiers. Recovering the user processing information makes it possible to reinforce the robustness of the indexing and of the searching in the memory for unique virtual mailpiece identifiers.

The method of the invention may have the following features:

- Said user processing information may comprise information about the spatial position of the recipient address block. As indicated above, recovery of this type of user processing information makes it possible to reinforce the robustness of the OCR processing for recognizing recipient addresses, or indeed the robustness of the computation of the components of a unique virtual mailpiece identifier.
- Said user processing information may comprise information about the spatial position of the sender address block.
- Said user processing information may comprise information indicative of a physical characteristic that is common to a plurality of mailpieces. Recovery of this information through the successive sorting passes may contribute, for example, to optimizing the filling of the sorting outlet receptacles.

BRIEF DESCRIPTION OF THE DRAWINGS

An implementation of the method of the invention is described below with reference to the drawings, in which.

DESCRIPTION OF IMPLEMENTATIONS

Figure 1:
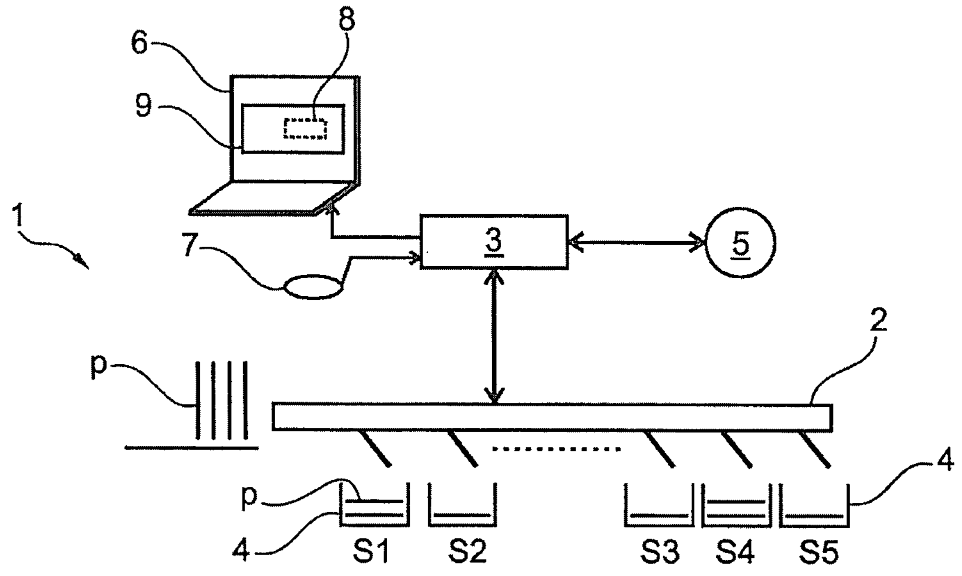
FIG. 1 is a highly diagrammatic view of a postal sorting machine with sorting outlets provided with receptacles for storing sorted mailpieces.

In FIG. 1, the postal sorting machine 1 includes a sorting conveyor 2 provided with a plurality of sorting outlets, only five (S1 to S5) of which are shown. The sorting machine 1 also includes a monitoring/control system 3 (a data processing unit including a memory) suitable for performing address recognition by OCR so as to control the actuators of the sorting conveyor in such manner as to direct each mailpiece towards one of the sorting outlets that corresponds to the recognized recipient address on the mailpiece.

Reference 4 designates a receptacle or tray associated with a sorting outlet and in which the mailpieces directed to said sorting outlet are stored and accumulated.

The postal sorting machine 1 may be part of a larger postal sorting set-up that can include a plurality of postal sorting machines distributed over various postal sorting sites. The monitoring/control systems 3 of said postal sorting machines may be connected together via a communications network 5 so as to enable data to be interchanged or transferred.

In the context of the invention, the mailpieces P may be sorted in a plurality of sorting passes in such manner as to be sequenced by recipient address (e.g. for delivery by the delivery person), in particular in at least two sorting passes, either on the same postal sorting machine or on two or more different postal sorting machines during successive sorting passes.

In general, sorting on the basis of the destination of the mailpiece requires said mailpiece to be subjected to a first machine pass in a postal sorting center referred to as an "outward" sorting center, followed by said mailpiece being subjected to a second machine pass in an "inward" sorting center.

The invention thus applies to postal sorting in which mailpieces P are presented as a stack at the inlet of a postal sorting machine, they are sorted in compliance with a first sorting plan (first sorting pass) in such manner as to be sequenced in sorting outlet receptacles 4 of the sorting machine, and then the articles P sorted and stored in each sorting outlet receptacle 4 are re-circulated to the inlet of the sorting machine (or to the inlet of another sorting machine) so that they can be sorted again in compliance with a second sorting plan (second sorting pass) in such manner as to be sequenced again in sorting outlet receptacles 4, and so on for the subsequent sorting passes, until sequencing is obtained that is adapted to delivery by the delivery person.

In the context of the invention, user processing information PF is input into the machine, e.g. before a batch of uniform mailpieces (a run) from the same sender is subjected to a first sorting pass. In the example, it is considered that said user processing information PF is constituted by the spatial coordinates of the recipient address block in the images of the mailpieces P of the run, but the invention may apply to other types of user processing information, be it input in a machine by an operator or be it produced in a machine by data processing.

Figure 2:
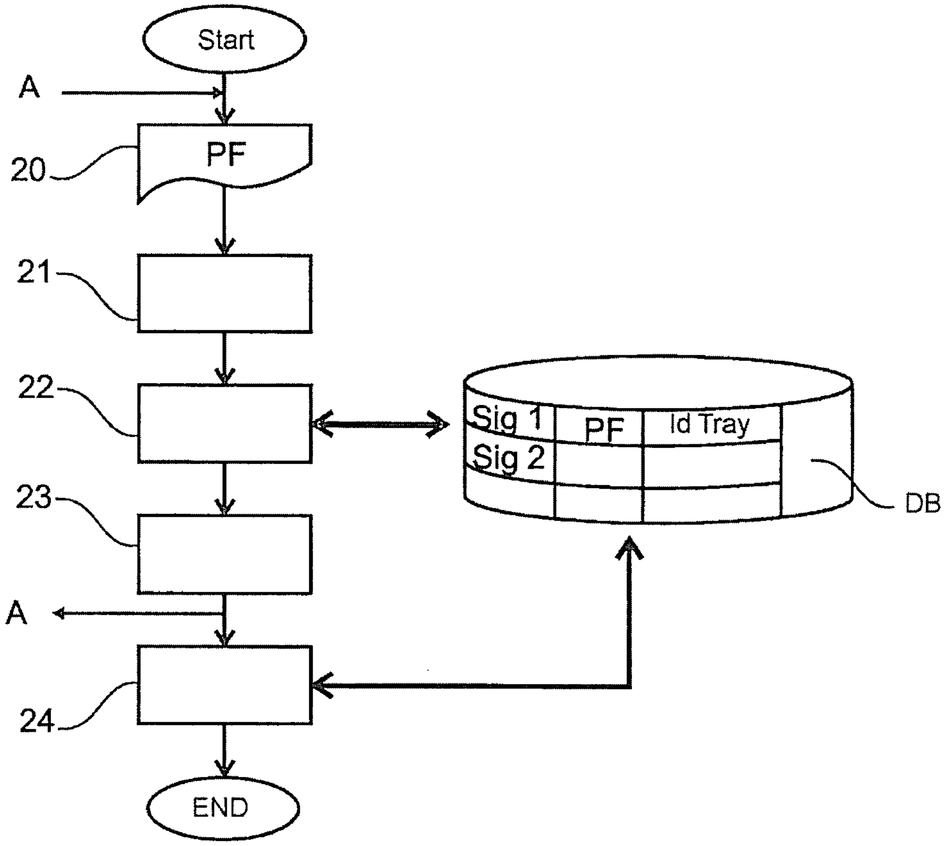
FIG. 2 shows how the sorting process proceeds during a first sorting pass of the invention in the machine shown in FIG. 1.

FIG. 2 shows an implementation of the postal sorting process of the invention during a first sorting pass of the mailpieces P. In step 20, user processing information PF is input in the machine by the machine operator, e.g. by means of a man/machine interface including a display screen 6 (see FIG. 1) and a checking member 7 on the display screen using a "clipping" technique that consists in defining a frame 8 around the recipient address block in a standard image 9 of a mailpiece in the run.

In step 21, a first mailpiece P of the run is unstacked and is moved on the sorting conveyor 2. A digital image of one face of said first mailpiece P is taken by a camera or the like as is well known, and is stored temporarily in the memory of the system 3.

In step 22, if user processing information is associated with the mailpiece P, a graphical signature or image profile is then derived from the digital image of the mailpiece P. This graphical signature has a digital descriptor computed, for example, on the basis of the luminance values for the pixels of the image, as indicated above. In a memory, the recording of this graphical signature Sig is associated with the user processing information PF applicable for said mailpiece. This association in the memory may be obtained in conventional manner by a logic address link between the recording of the graphic signature and the location in which said information PF is recorded, or indeed by indicating the user processing information in a field of the recording of the graphical signature. It should be noted that the graphical signatures may be stored in a database as represented herein by a database DB that is internal to the system 3 but that may also be remote from the postal sorting machine 1. In FIG. 2, the database DB is represented symbolically in the form of a table in which the rows correspond to recordings of different graphical signatures indicated by Sig1, Sig2, etc. Each graphical signature such as Sig1 is associated with user processing information, indicated by PF for the signature Sig1.

In step 23, the process continues by OCR processing for recognizing the recipient address that is applied more particularly within the zone of the image of the mailpiece that is defined by said user processing information PF. It should be noted that the steps 22 and 23 may be inverted without going beyond the ambit of the invention.

It is assumed that, at this stage of the sorting process, the recipient address is recognized unambiguously by the OCR processing, and, in step 23, the mailpiece is thus directed through the sorting conveyor 2 towards a sorting outlet, e.g. the outlet S1, corresponding to the recognized address so as to be stored in a corresponding sorting outlet receptacle 4. It is assumed that, in the system 3, a logic identifier IdTray is assigned to each sorting outlet receptacle 4 of the machine and thus said identifier IdTray can, in step 22, in the memory of the database DB, be associated with the recording of the signature Sig1 computed for the corresponding mailpiece.

Steps 21 to 23 are repeated for each subsequent mailpiece P. At the end of this processing process in the first sorting pass, a set of graphical signatures is available in the memory of the system 3, which signatures are related to respective items of user processing information PF and to sorting outlet receptacle identifiers. In this sorting process, other user processing information may be input manually or produced automatically in the first sorting pass for other runs. It should be noted that the method of the invention may also operate without sorting outlet receptacle identifiers, the tray identifiers serving, in such a situation, to limit the search space for searching for graphical signature matches during the second sorting pass.

When a sorting outlet receptacle that is full of mailpieces is to be removed from the sorting machine so as to be re-circulated for a second mailpiece sorting pass, in step 24 a dictionary of graphical signature classes is created dynamically, which dictionary is associated with said receptacle (or a segment of the database DB that can be seen as a local dictionary or directory is created), in which dictionary each graphical class $Sig_{Mean}$ of the dictionary is representative of the graphical signatures associated with the mailpieces stored in the receptacle and that, overall, are part of the same run and have images that are graphically similar. As indicated above, the descriptor of each graphical class corresponds to a consolidated value computed on the basis of the descriptors of the corresponding graphical signatures, e.g. it corresponds to the mean value of said descriptors.

Figure 3:
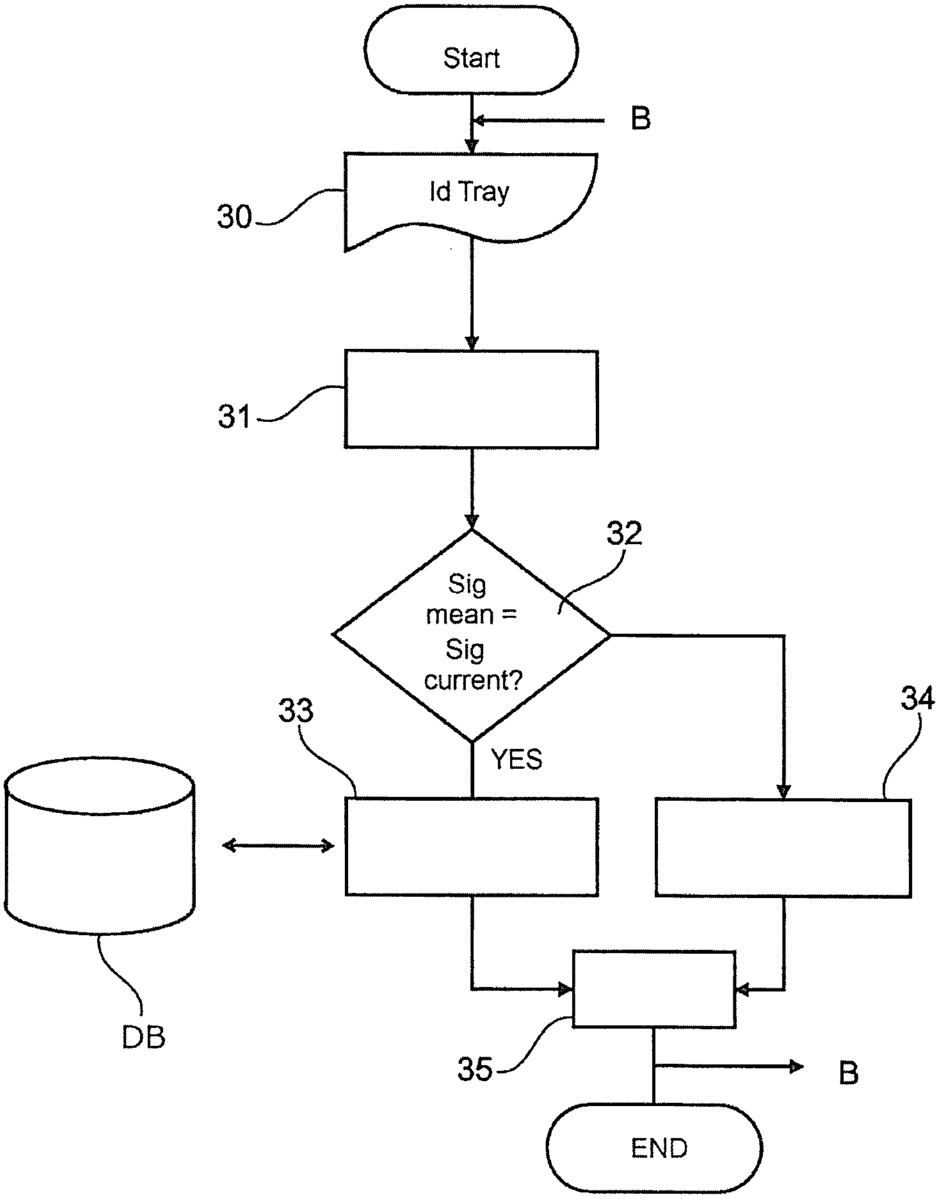
FIG. 3 shows how the sorting process proceeds in a second sorting pass of the invention in the machine shown in FIG. 1.

FIG. 3 shows the sorting process for a second sorting pass for sorting the mailpieces P. It is assumed that, at this stage of the process, the mailpieces stored in a sorting outlet receptacle 4 are re-circulated into the inlet of the same postal sorting machine 1. In step 30, a mailpiece receptacle is brought to the inlet of the sorting machine and its identification number IdTray is recognized by the machine. A segment or all of the database DB is then loaded into the memory of the sorting machine so that a small dictionary of graphical classes is made available in the memory of the machine.

In step 31, a first mailpiece P re-circulated for a second sorting pass is thus unstacked and moved on the sorting conveyor 2 of the machine. An image of the face of said mailpiece is then taken again, and a current graphical signature $Sig_{current}$ is computed again on the basis of this image. In step 31, the dictionary in the database DB is scanned to detect any match, on the basis of a graphical resemblance criterion based, for example, on a normalized correlation coefficient, between one of the graphical classes $Sig_{Mean}$ of the dictionary and the current signature $Sig_{current}$. When a match is detected in step 32, the user processing information PF associated with the identified graphical class identified in the dictionary is retrieved by association in the memory, and the process continues in step 33 with recipient address recognition processing again using OCR, which processing is applied more particularly to the zone of the image of the mailpiece that is defined by the user processing information PF.

This further processing thus benefits from the contribution from the user processing information PF input in the first sorting pass. This recovery of user processing information in the second sorting pass contributes, for example, to reinforcing the robustness of the address recognition on the mailpieces.

When no match is detected in step 32, the sorting process continues, in step 34, with a conventional OCR recognition process with no particular parameterization. Then the postal sorting process continues in step 35 with the mailpiece being transferred to a sorting outlet, and goes back to step 30 for another mailpiece.

Steps 31 to 35 are repeated for the subsequent mailpieces to be sorted in the second sorting pass in the sorting machine.

In this postal sorting process, it should be understood that, in general, the mailpieces sorted and stored in a sorting outlet receptacle of a sorting outlet coming from one machine are re-circulated into the inlet of another postal sorting machine. It is thus possible to have a large number of sorting outlet receptacles distributed over a large number of sorting machines in the second sorting pass. In this context, it is advantageous to feed back a limited context of graphical classes to the level of the machine memory of each system 3 for a second sorting pass in such manner as to accelerate the search for matches. That is why a dynamic dictionary of graphical classes that is associated with each receptacle is compiled at the end of the first sorting pass or at the beginning of the second sorting pass.

The principle of the invention for recovering user processing information between sorting passes also applies for the sorting passes subsequent to the second sorting pass.

The invention claimed is:

1. A postal sorting method in which mailpieces are subjected to at least two sorting passes in a machine so as to be sequenced in sorting outlets of the machine, and user processing information is available in the machine during a first sorting pass in relation to at least a certain mailpiece, said postal sorting method comprising, in a memory of a data processing unit, associating said user processing information with a graphical signature of said certain mailpiece that is representative of an image of said certain mailpiece during the first sorting pass, and recovering, during the second machine sorting pass of said certain mailpiece, said user processing information that is associated with said certain mailpiece on the basis of matching of graphical signatures between said first and second sorting passes, using a graphical resemblance criterion;

wherein, while a set of mailpieces are being recirculated into the machine for a second sorting pass, graphical signatures associated respectively with user processing information are filtered for the purpose of dynamically creating a dictionary of graphical classes, and wherein matching is detected between a graphical class and a graphical signature of a mailpiece as computed during the second sorting pass for the purpose of recovering the user processing information associated with said mailpiece.

2. A method according to claim 1, wherein each graphical class has a descriptor that is a mean value of descriptors of a plurality of graphical signatures.

3. A method according to claim 1, wherein said user processing information comprises information about the spatial position of the recipient address block.

4. A method according to claim 1, wherein said user processing information comprises information about the spatial position of the sender address block.

5. A method according to claim 1, wherein said user processing information is fed into the machine during the first sorting pass by a machine operator.

6. A method according to claim 1, wherein said user processing information is pre-recorded in a memory in the machine.

7. A method according to claim 1, wherein said user processing information is produced by data processing in the machine during the first sorting pass of the mailpieces.

8. A method according to claim 1, further comprising the step of during the second machine sorting pass of said certain mailpiece, capturing another image of said mailpiece and applying address recognition processing in the data processing unit to a zone of the image based on the user processing information.

9. A method according to claim 1, wherein said user processing information comprises information indicative of a physical characteristic that is common to a plurality of mailpieces.

10. A method according to claim 9, wherein said information indicates that a mailpiece has a plastics wrapper.

11. A method according to claim 9, wherein said information indicates that a mailpiece is of the open type or of the magazine type.

* * * * *